Dec. 14, 1965  F. A. REIFENHAUSER  3,222,722
APPARATUS FOR EXTRUDING ELONGATED PLASTIC BODIES
Filed July 3, 1964  2 Sheets-Sheet 1
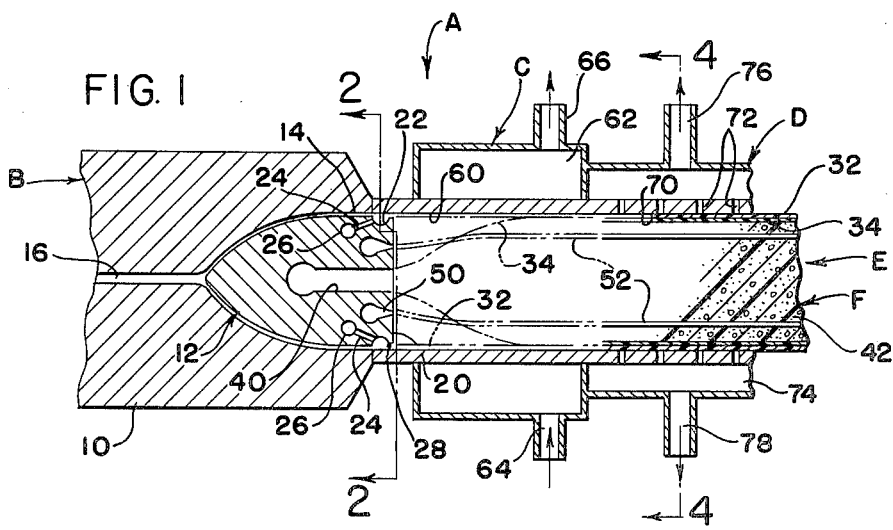
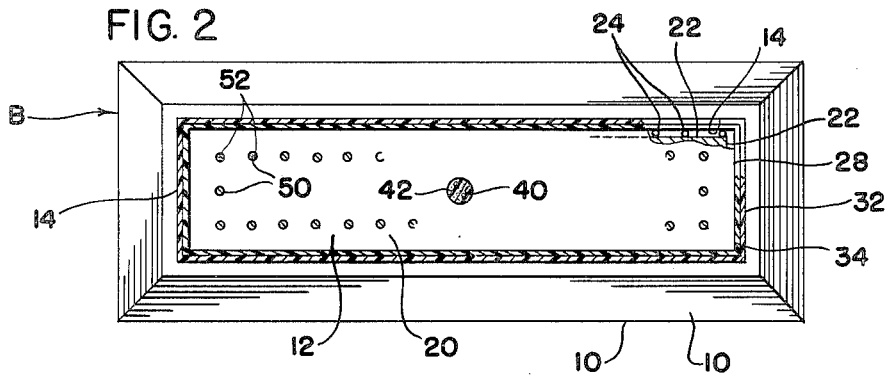
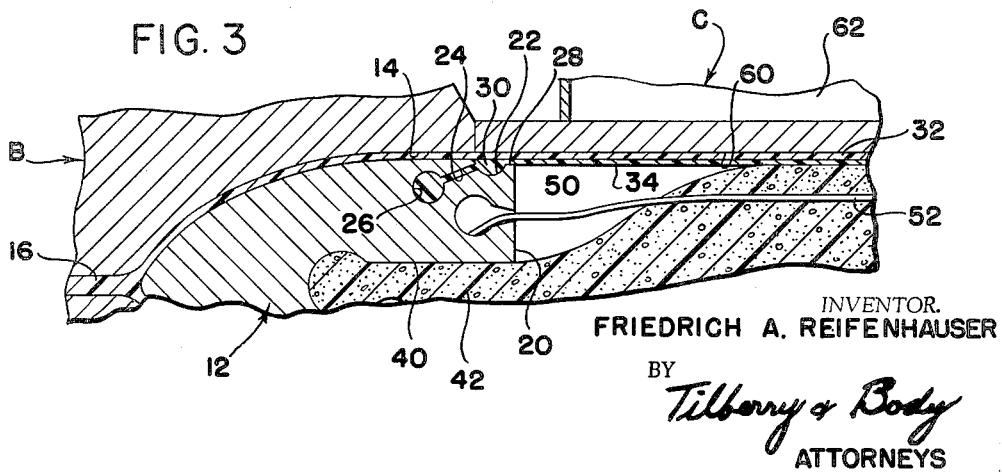
INVENTOR.
FRIEDRICH A. REIFENHAUSER
BY
Tilbury & Body
ATTORNEYS Dec. 14, 1965   F. A. REIFENHAUSER   3,222,722
APPARATUS FOR EXTRUDING ELONGATED PLASTIC BODIES
Filed July 3, 1964   2 Sheets-Sheet 2

INVENTOR.
FRIEDRICH A. REIFENHAUSER
BY
Tilberry & Body
ATTORNEYS

United States Patent Office 3,222,722
Patented Dec. 14, 1965

3,222,722
APPARATUS FOR EXTRUDING ELONGATED PLASTIC BODIES
Friedrich A. Reifenhauser, Troisdorf, Bezirk Cologne, Germany, assignors to Reifenhauser K.G., Troisdorf, Bezirk Cologne, Germany
Filed July 3, 1964, Ser. No. 380,176
Claims priority, application Germany, July 9, 1963, R 35,636
9 Claims. (Cl. 18—13)

This application is a continuation-in-part application of my copending application Serial No. 313,720 filed September 25, 1963, which was a continuing application of copending application Serial No. 56,087 filed September 8, 1960, now abandoned which was in turn a continuation-in-part application of a copending application Serial No. 521,836, filed July 13, 1955, now abandoned, and entitled Method and Apparatus for Shaping Tubing and the Like.

This invention pertains to the art of forming plastic bodies and more particularly to an apparatus for extruding elongated plastic bodies.

The present invention is particularly applicable to forming tubular plastic bodies having an outer thermoplastic shell and filled with a foamed plastic material and it will be described with particular reference thereto; however, it is to be appreciated that the invention has much broader applications and may be used for forming elongated plastic bodies having various shapes.

My copending application Serial No. 313,720, of which the present application is a continuation-in-part application, discloses a method and apparatus for forming elongated tubular bodies having a foamed plastic inner core and a coating of thermoplastic material in which an extruding head having a generally tubular nozzle simultaneously extrudes the outer thermoplastic material into a tubular shape and fills this tubular shape with a foamable plastic material. The foamable material foams in the tubular, extruded body to fill the same as the tubular body is being cooled. At the exit end of the extrusion nozzle, there is disclosed in this copending application a sizing sleeve having a sizing passage therein for receiving the thermoplastic tubular body. A vacuum is directed through the sizing sleeve so that the tubular body is drawn outwardly into contact with the sizing passage through the sleeve. In this manner, the desired outer dimensions of the tubular, foam filled body are accurately fixed.

The present invention is directed toward an improvement in the apparatus as disclosed in my copending application Serial No. 313,720. In accordance with this improvement, there is provided an extrusion apparatus comprising an extrusion orifice with at least one generally flat side, means for forcing a heated thermoplastic material through the orifice to form an elongated plastic body having a cross-sectional shape corresponding to the shape of the orifice, a recess coterminous with the flat side of the orifice and opening toward the extruded body adjacent the exit end of the orifice, and means for supplying an adhesive liquid to the recess whereby the adhesive liquid is deposited onto the extruded body as it passes through or from the orifice.

In this manner, an adhesive is applied to one surface of the extruded body. When this body is tubular and is filled with a foamed material, the adhesive forms a bond between the inner surface of the tubular, extruded body and the inner foamed material or core. This prevents relative movement between the core and the tubular body to substantially rigidify the resulting extrusion. It has been found that structural blocks may be formed in this manner and the adhesive substantially increases the strength of these blocks.

In accordance with another aspect of the present invention there is provided a further improvement of the apparatus as disclosed in my copending application Serial No. 313,720. In accordance with this aspect of the present invention there is provided an apparatus for extruding a foam filled tubular plastic body comprising an outer extruder body, an inner extruder core, the body and the core coacting to form a generally tubular extrusion orifice, means for forcing heated thermoplastic material through the orifice to form an elongated, tubular plastic body, an injection orifice in the core, means for forcing a foamable plastic material through the injection orifice and into the tubular body where it foams to fill the body, and means for depositing reinforcing material into the tubular body as it is being extruded and filled with the foamable material.

In accordance with this aspect of the present invention, wires, plastic strips and other reinforcing elements can be applied within the extruded body as it is being formed by the extruder. This reinforcing material further adds to the over-all strength of the resulting extrusion.

The primary object of the present invention is the provision of an apparatus for extruding an elongated body with an adhesive on one side thereof.

Another object of the present invention is the provision of an apparatus for extruding an elongated, tubular, foam filled body which apparatus produces a body having superior strength to the bodies heretofore formed in similar apparatus, is economical in use and can be easily used with existing extruding equipment.

Still another object of the present invention is the provision of an apparatus for extruding an elongated, tubular, foam filled body which body has a bond between the inner foamed material and the walls of the tubular body.

Another object of the present invention is the provision of an apparatus for extruding an elongated, tubular, foam filled body which body has reinforcing material extending longitudinally therethrough.

These and other objects and advantages will be apparent from the following description used to illustrate the preferred embodiment of the present invention as read in connection with the accompanying drawings in which:

FIGURE 1 is a side elevational, cross-sectional, somewhat schematic view illustrating the preferred embodiment of the present invention;

FIGURE 2 is a cross-sectional view taken generally along line 2—2 of FIGURE 1;

FIGURE 3 is an enlarged, partial, cross-sectional view illustrating one aspect of the present invention;

Figure 4:
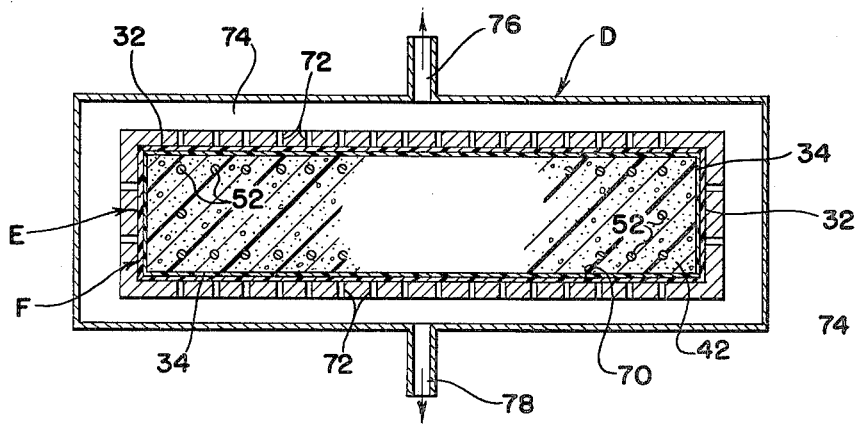
FIGURE 4 is a cross-sectional view taken generally along line 4—4 of FIGURE 1.
Figure 5:
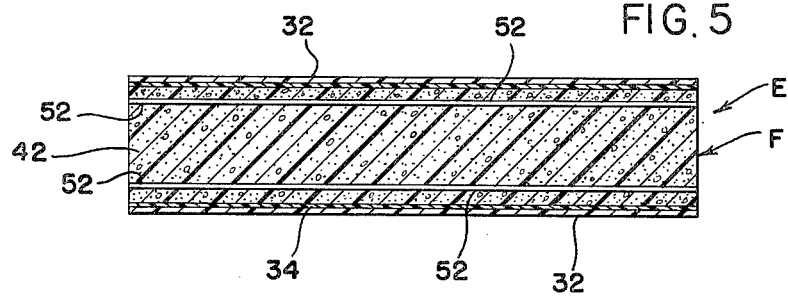
FIGURE 5 is a cross-sectional view of an extruded tubular body constructed in accordance with the present invention.

Referring now to the drawings wherein the showings are for the purpose of illustrating a preferred embodiment of the invention only and not for the purpose of limiting same, FIGURE 1 shows an extrusion apparatus A including an extrusion head B, a cooling sleeve C and a sizing sleeve D utilized to form tubular body E having an inner foamed core F as best shown in FIGURES 4 and 5.

The extrusion head B includes an outer body 10 and an inner core 12 which are so shaped that they form a generally rectangular orifice 14 as is best shown in FIGURE 2. It is appreciated that various other orifice shapes could be utilized in practicing the invention; however, in accordance with the preferred embodiment of the invention, the tubular body E is cut into lengths and used for building blocks. For this purpose, a generally rectangular extrusion orifice 14 is appropriate. The orifice 14 is communicated in a known manner with an inlet channel 16 formed within body 10 which inlet channel is connected to a supply of heated thermoplastic material under pressure so that the material is forced through the orifice to shape a tubular thermoplastic shell for the body E. As so far described, the extrusion head B does not differ from the extrusion head as described in my copending application Serial No. 313,720. In accordance with this invention, the core 12 has a forwardly protruding extension 20, see FIGURE 3, having a periphery generally matching the periphery of orifice 14 and a recess 22. The recess 22 extends along the periphery of orifice 14 and is generally coterminous therewith. The recess is connected by conduit 24 to a passage 26 so that a liquid adhesive 30 can be directed through passage 26 into the recess 22. The recess is generally defined by two walls the first facing the entrant end of orifice 14 and having a shape substantially identical to the orifice and the second facing away from orifice 14 and having an outer periphery corresponding to the periphery of orifice 14, but being spaced inwardly therefrom a slight distance. In this manner, as tubular extrusion 32 is forced through the orifice, the adhesive liquid 30 within recess 22 applies a layer 34 on the inner side of the extrusion. The inward spacing of wall 28 determines, somewhat, the thickness of the layer 34. Consequently, the wall 28 forms a wiper or calibrator for distributing the adhesive 30 onto the inner surface of extrusion 32.

Core 12 of extrusion head B includes a centrally disposed foam ejection passage 40 which directs a foamable plastic material 42 through the passage and into the interior of the tubular extrusion 32. When this material enters the tubular extrusion 32, it foams and fills the extrusion with a core that subsequently hardens and gives body to the tubular extrusion. The adhesive layer 24 forms a bonded joint between the extrusion 32 and the foamed core F, resulting from the foaming and solidifying of material 42. In this manner, there is no relative movement between the core F and the tubular thermoplastic extrusion 32 so that the tubular body E is a substantially unitary structure.

The core 12 also includes a plurality of orifices 50 for extruding or feeding reinforcing wire, strip or other strands, designated as 52, into the tubular body E as it is being formed by apparatus A.

The strands 52 extend longitudinally of body E; therefore, they add rigidity to the body.

Referring now to cooling sleeve C, as shown in FIGURE 1, the cooling sleeve includes an inner passage 60 having a dimension substantially corresponding to the dimension of tubular extrusion 32 as it leaves the orifice 14. Surrounding the passage 60 there is provided a cooling manifold 62 having an inlet 64 and an outlet 66 for directing a cooling fluid, such as water, through the manifold so that the passage 60 reduces the temperature of the extrusion 34 to a semi-solid state.

Thereafter, the tubular extrusion 32 passes into the sizing sleeve D having an inner passage 70 generally matching the desired, final outer contour to be imparted to tubular body E. The passage 70 is communicated by orifices 72 with a surrounding manifold 74 having vacuum conduits 76, 78. As the tubular extrusion 32 progresses through the sizing sleeve D, the vacuum in manifold 74, through orifices 72, draws the extrusion 32 against the passage 70 so that the shape of the passage is imparted to this extrusion. In this manner, as described in more detail in my copending application Serial No. 313,-720, the outer shape of the tubular body E is maintained in relatively close limits.

After tubular body E is formed as so far described, it is cut into lengths as shown in FIGURE 5. These lengths can be used for a variety of purposes; however, in accordance with the invention, these lengths are used for building blocks and analogous purposes.

The present invention has been described in connection with a preferred embodiment; however, various changes may be made in this embodiment without departing from the intended spirit and scope of the present invention as defined in the appended claims.

Having thus described my invention, I claim:

1. An apparatus for extruding a foam filled tubular plastic body comprising an outer extruder body, an inner extruder core, said body and core coacting to form a generally tubular extrusion orifice, means for forcing heated thermoplastic material through said orifice to form an elongated, tubular plastic body, a recess in said core and coterminous with at least a portion of said orifice, said recess opening toward said tubular body adjacent the exit end of said orifice, means in said core for supplying an adhesive liquid to said recess whereby said adhesive liquid is deposited onto the inner surface of said body as it passes through said orifice, an injection orifice in said core and means for forcing a foamable plastic material through said injection orifice and into said tubular body where it foams to fill said body with said adhesive liquid bonding said foamed plastic material to said extruded tubular body.

2. An extrusion apparatus as defined in claim 1 including a cooling sleeve immediately adjacent the exit end of said orifice, said cooling sleeve having an inner passage generally matching the external shape of said extruded tubular body for cooling said thermoplastic material of said body to at least a semi-solid condition.

3. An extrusion apparatus as defined in claim 2 including a sizing sleeve immediately adjacent the exit end of said cooling sleeve, said sizing sleeve having an inner passage with a profile matching the desired final shape of said tubular body, means for applying a vacuum in said inner passage of said sizing sleeve to draw said tubular body into engagement with said inner sizing passage and means for cooling said tubular body to solidify the thermoplastic material of said tubular body as it is passing through said sizing passage.

4. An extrusion apparatus as defined in claim 1 including a sizing sleeve immediately adjacent the exit end of said orifice, said sizing sleeve having an inner passage with a profile matching the desired final shape of said tubular body, means for applying a vacuum in said inner passage of said sizing sleeve to draw said tubular body into engagement with said inner sizing passage and means for cooling said tubular body to solidify the thermoplastic material of said tubular body as it is passing through said sizing passage.

5. An extrusion apparatus as defined in claim 1 including at least an opening in said core and means for forcing a reinforcing element through said opening and into said tubular body as it is being extruded through said orifice.

6. An extrusion apparatus as defined in claim 1 wherein said coterminous recess is defined between two parallel walls one facing toward the entrant end of said orifice and one facing toward the exit end of said orifice with said wall facing toward the exit end of said orifice being spaced from said extruded body passing through said orifice a predetermined distance to deposit an adhesive layer of predetermined thickness onto said body.

7. An extrusion apparatus comprising an outer first member and an inner second member, said members defining a tubular extrusion orifice with an entrant end and an exit end, means for forcing a heated thermoplastic material through said orifice to form an elongated tubular body having a cross-sectional shape corresponding to said orifice, said second member having a means forming a recess coterminous with said extrusion orifice and opening toward said extruded body adjacent the exit end of said orifice, an injection passage in said second member for injecting a foamable plastic material into said tubular body to fill the same as it issues from said extrusion orifice, and means for supplying an adhesive liquid to said recess in said second member whereby said adhesive liquid is deposited on the inner surface of said tubular body and bonds said foamable plastic material onto said inner surface.

8. An extrusion apparatus as defined in claim 7 wherein said recess in said inner second member is defined between two substantially parallel walls one facing toward the entrant end of said orifice and the other facing toward the exit end of said orifice with said wall facing toward the exit end of said orifice being spaced from the inner surface of said extruded body passing through said orifice, said spacing being a predetermined distance to deposit an adhesive layer of predetermined thickness onto the inner wall of said tubular body.

9. An extrusion apparatus as defined in claim 7 wherein said inner second member includes a plurality of orifices, and means for forcing reinforcing strands through said orifices as said tubular body is being extruded through said extrusion orifice.

References Cited by the Examiner
UNITED STATES PATENTS

| | | | |
|---|---|---|---|
| 2,286,922 | 6/1942 | Muller | 18—13 |
| 2,337,927 | 12/1943 | Reichel et al. | 18—14 |
| 2,456,141 | 12/1948 | Myerson | 18—13 |
| 2,519,375 | 8/1950 | Jargstoff et al. | |
| 2,569,373 | 9/1951 | Fay | 18—13 |
| 2,620,515 | 12/1952 | Olson | 18—14 X |
| 2,632,205 | 3/1953 | Fitz Harris | 18—14 X |
| 2,687,553 | 8/1954 | Colombo | 18—13 |
| 2,716,778 | 9/1955 | Beare | 264—171 |
| 3,007,205 | 11/1961 | House | 264—171 |
| 3,029,476 | 4/1962 | Merck et al. | 264—47 |

WILLIAM J. STEPHENSON, *Primary Examiner.*

MICHAEL V. BRINDISI, *Examiner.*